United States Patent [19]

Truman

[11] Patent Number: 4,457,435

[45] Date of Patent: Jul. 3, 1984

[54] POPCORN KERNAL SEPARATOR

[76] Inventor: Larry W. Truman, 235 E. Center, Kaysville, Utah 84037

[21] Appl. No.: 305,530

[22] Filed: Sep. 25, 1981

[51] Int. Cl.³ .............................................. B07B 1/22
[52] U.S. Cl. .................................. 209/683; 99/323.11; 209/288
[58] Field of Search ............... 209/614, 683, 288, 687, 209/235; 133/3 B, 3 A, 3 C; 15/3.1; 130/30 R; 99/323.11, 569, 323.9

[56] References Cited

U.S. PATENT DOCUMENTS

| 32,211 | 4/1861 | Starrett | 209/288 |
|---|---|---|---|
| 185,969 | 1/1877 | Rivers | 209/288 |
| 468,102 | 2/1892 | Staley | 99/323.11 |
| 1,395,715 | 11/1921 | Knott | 209/235 X |
| 1,516,782 | 11/1924 | Oberschmidt | 99/323.11 |
| 1,812,468 | 6/1931 | Brooke | 209/683 X |
| 1,824,915 | 9/1931 | Mitchell | 209/288 X |
| 3,729,096 | 4/1973 | Fitzner et al. | 209/664 |
| 3,942,644 | 3/1976 | Vissers . | |

FOREIGN PATENT DOCUMENTS 682284 8/1979 U.S.S.R. .............................. 209/288

Primary Examiner—Robert B. Reeves
Assistant Examiner—Donald Hajec
Attorney, Agent, or Firm—B. Deon Criddle

[57] ABSTRACT

A low cost, manually operated, popcorn kernal separator. The separator includes a support stand and a perforated drum with a lid enclosing a front opening and the access of the drum mounted angularly with respect to the horizontal leg of the support base. The perforated drum also serves as a serving bowl for popped corn therein.

3 Claims, 3 Drawing Figures

POPCORN KERNAL SEPARATOR

BRIEF DESCRIPTION OF THE INVENTION

1. Field of the Invention

This invention relates to devices for separating the unpopped kernals from the popped corn in a batch of popcorn.

2. Prior Art

There has long been a need for devices to separate the unpopped kernals from the popped corn in a batch of cooked popcorn. In the past, others have proposed means for separating the grains of popped corn from the unpopped grains. This has generally been done through use of a corn popping machine that will separate the popped kernals from the unpopped kernals that are still being subjected to heat. Such devices are shown for example in U.S. Pat. Nos. 1,196,563, 1,516,782, and 1,584,455. So far as we are aware, however, there has not heretofore been a device available that will separate the unpopped kernals from the popped corn when the entire batch is placed therein and the machine is operated.

U.S. Pat. No. 32,211, discloses an Ash Sieve that is particularly adapted to separate coal ashes from unburned coal. In this device, a perforated drum is positioned to have the perforations inside a housing and an end projecting from the housing. Coal ash is fed into the drum by removing an end cover from the projection end of the drum and turning the drum to be in an upright position. Thereafter, the cover is removed, the housing is turned to place the drum in a horizontal position and the drum is rotated to permit the ash to fall into a drawer that extends into the housing.

OBJECTS OF THE INVENTION

Principal objects of the present invention are to provide a low cost device that can be conveniently used to separate the unpopped kernals from the popped kernals in a batch of popcorn.

Other objects are to provide such a popcorn kernal separating device that will permit a batch of popcorn to be easily placed therein and that will effectively drop the unpopped kernals through while retaining the popped corn.

Yet another object is to provide such a device for the separation of unpopped popcorn kernals that can also be readily used to mix butter, salt, cheese, or other condiments with the popped popcorn kernals.

Still another object is to provide a popcorn kernal separating device with a drum that can be readily removed and used as a serving bowl for the popped corn therein.

PRINCIPAL FEATURES OF THE INVENTION

Principal features of the invention include a support base having a horizontal surface and an upwardly extending upright surface to which the closed rear end of a flared, perforated drum is journaled. A front end of the drum is closed by a cover and a handle is provided to rotate the drum about a post serving as the journal connection with the support base.

The drum perferably has a closed dish-like portion at the rear or bottom end thereof and a flared wall extending outwardly from the leading edge of the dish-like portion, said flared wall having perforations therein of a size to permit the passage of unpopped popcorn kernals, while preventing the passage of popped corn kernals.

The dish-like portion supports the popped corn when the drum is lifted off the post and is used as a serving bowl.

Other objects and features of the invention will become apparent from the following detailed description and drawing, disclosing what is presently contemplated as being the best mode of the invention.

THE DRAWING

In the drawing

FIG. 1 is a perspective view of the popcorn kernal separator of the invention;

FIG. 2, a side elevation view, partially broken away to show the drum journaled to the base; and FIG. 3, a vertical section taken on a line 3—3 of FIG. 1.

DETAILED DESCRIPTION

Figure 1:
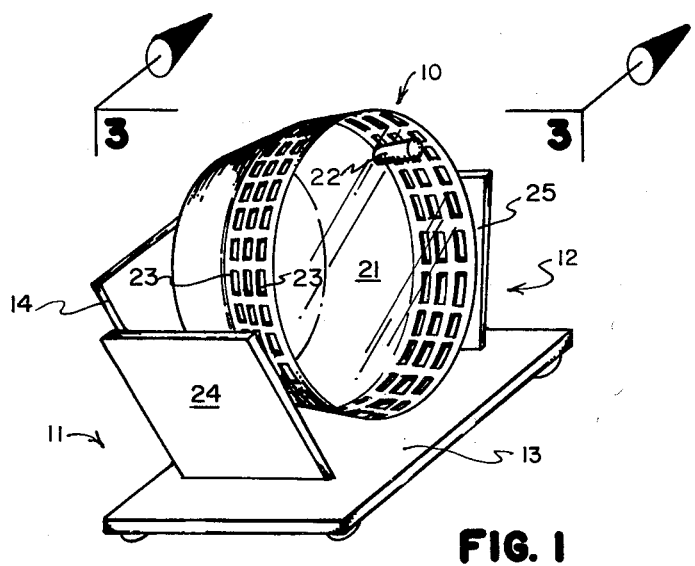
Figure 2:
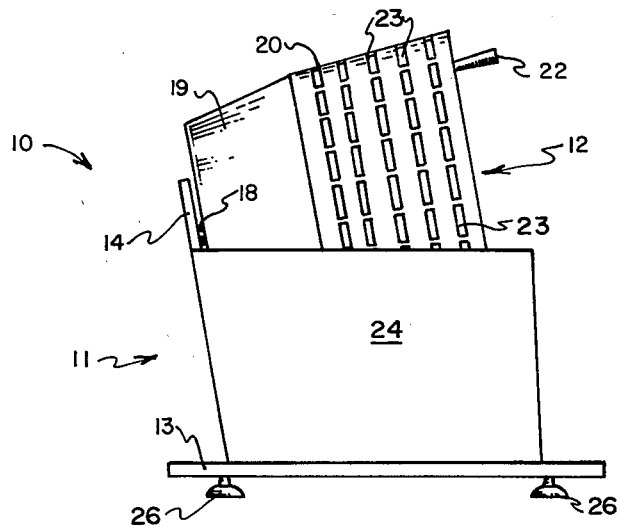
Figure 3:
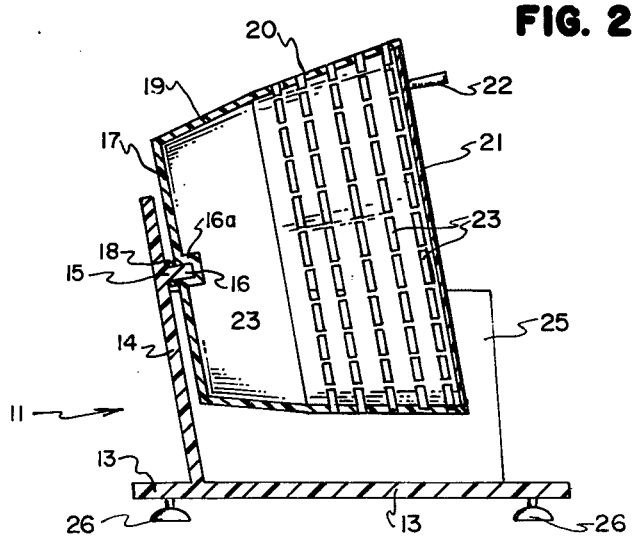

Referring now to the drawings:

In the illustrated preferred embodiment of the invention, the popcorn kernal separator, shown generally at 10 includes a support base 11 on which is journaled a drum 12.

The support base 11 includes a platform 13 that is adapted to rest on a counter, or the like, and to provide a horizontal support for the device. An upstanding leg 14 is fixed to the platform 13 and projects upwardly therefrom so as to form an acute angle with the platform of approximately 75°. A post 15 projects from the upper end of leg 14 so that the post can be inserted into a hole 16 formed in a base 16a in the rear wall or bottom wall 17 of the drum 12, as will hereinafter further be explained.

Post 15 extends through a bearing spacer 18 and into the hole 16 at the center of a rear wall 17 of the drum 12. The drum 12 includes a wall portion 19 that extends outwardly from the back wall 18 and that forms with the wall 18 a dish-like portion of the drum. A perforated wall, portion 20 extends outwardly from the outer edge of the dish-like portion to define an inlet opening to the drum. A cover 21 is adapted to fit tightly within the opening formed by wall 20 and to close the opening. A handle 22 is fixed to and projects from the cover 21 and the cover 21 fits sufficiently tight within the opening that when the handle 22 is grasped, it can be used to rotate the entire drum about the axis of the post 15. The holes 23 provided within the perforated wall 20 are sized to permit the passage of unpopped popcorn kernals therethrough, but to prevent the passage of popped kernals of corn. It has been found that if the wall 19 is flared with respect to the base 18 to provide an acute angle of about 47°, and that the wall 20 is flared with respect to the wall 19 to provide an acute angle of about 20°, a most efficient separation of popcorn kernals from popped kernals of corn, will occur during use.

In using the popcorn separator 10, the drum 12 is placed on post 15, the cover 21 is removed and a batch of popped popcorn is placed therein. The cover 21 is replaced and the handle 22 is grasped. Using the handle 22, the drum is rotated about the axis of the post 15 until the desired separation of unpopped popcorn kernals has occurred. During the rotation, the contents of the drum gravitate towards the platform 13 and, because of the angle of the support leg 14, towards the leg 14. As the drum is rotated, the contents are moved out and across the perforated wall 20 such that the unpopped kernals will fall through the perforations 23 to the base 13 at the lowest portion of the wall 20.

The perforations 23 are preferable elongated in the direction of travel so that melted butter or the like can be poured through from outside the drum to mix with the popped corn.

After the unpopped kernals have been separated from the popped corn, the drum can be removed by lifting it from post 15 and the drum can then be used as serving bowl for the popped corn retained therein.

Angled side panels 24 and 25 extending outwardly and upwardly from the platform 13 and forwardly from the upstanding leg 14 serve to positively retain the kernals falling from drum 12. Suction cup feet 26 may also be provided beneath platform 13 to stabilize the separator 10 on a counter, or the like.

Although a preferred embodiment of my invention has been herein disclosed, it is to be understood that the present disclosure is by way of example and that variations are possible without departing from the subject matter coming within the scope of the following claims, which subject matter I regard as my invention.

I claim:
1. A popcorn kernal separator comprising:
    a support base including a horizontal platform and a support leg extending upwardly from the horizontal platform;
    a drum having a fully closed rear wall, a side wall extending from the periphery of the rear wall, defining an inlet opening into the drum and including a first wall portion forming with the rear wall, a closed dish-like portion and a perforated wall portion extending therefrom to said inlet opening, said perforated wall portion permitting the passage of unpopped kernals therethrough and preventing passage of popped popcorn kernals;
    a post extending from the support leg;
    means defining a hole formed centrally into a portion of the rear wall, said hole slidably fitting over the post to journal the center of the rear wall to the upwardly extending leg whereby the drum is rotatable over the horizontally extending platform and is easily placed on and removed from the post;
    a removable cover adapted to close the inlet opening defined by the side wall; and
    handle means for rotating the drum about the journal connection with the upright leg.
2. A popcorn kernal separator as in claim 1 wherein the handle means is fixed to the cover.
3. A popcorn kernal separator as in claim 1 further including
    at least one side panel extending upwardly from the platform to direct kernals from the rotating drum to the platform.

* * * * *